US00RE43570E

(19) United States
(12) Reissued Patent
Gao

(10) Patent Number: US RE43,570 E
(45) Date of Reissued Patent: *Aug. 7, 2012

(54) METHOD AND APPARATUS FOR IMPROVED WEIGHTING FILTERS IN A CELP ENCODER

(75) Inventor: Yang Gao, Mission Viejo, CA (US)

(73) Assignee: Mindspeed Technologies, Inc., Newport Beach, CA (US)

( * ) Notice: This patent is subject to a terminal disclaimer.

(21) Appl. No.: 12/157,945

(22) Filed: Jun. 13, 2008

Related U.S. Patent Documents

Reissue of:
(64) Patent No.: 7,062,432
Issued: Jun. 13, 2006
Appl. No.: 10/628,904
Filed: Jul. 28, 2003

U.S. Applications:
(63) Continuation of application No. 09/625,088, filed on Jul. 25, 2000, now Pat. No. 7,013,268.

(51) Int. Cl.
*G10L 19/12* (2006.01)

(52) U.S. Cl. ..... 704/220

(58) Field of Classification Search ..... 704/220
See application file for complete search history.

(56) References Cited

U.S. PATENT DOCUMENTS

| | | | |
|---|---|---|---|
| 4,720,861 | A | 1/1988 | Bertrand |
| 5,195,137 | A | 3/1993 | Swaminathan |
| 5,293,449 | A | 3/1994 | Tzeng |
| 5,491,771 | A | 2/1996 | Gupta et al. |
| 5,495,555 | A | 2/1996 | Swaminathan |
| 5,633,982 | A | 5/1997 | Ganesan et al. |
| 5,717,824 | A | 2/1998 | Chhatwaal |
| 5,864,798 | A | 1/1999 | Miseki |
| 6,246,979 | B1 | 6/2001 | Carl |
| 6,470,309 | B1 | 10/2002 | McCree |

(Continued)

FOREIGN PATENT DOCUMENTS

EP 2 259 255 12/2010

(Continued)

OTHER PUBLICATIONS

TIA/EIA IS-641-A, TDMA Cellular/PCS—Radio Interface Enhanced Full-Rate Voice Codec, Revision A.

(Continued)

*Primary Examiner* — Susan McFadden
(74) *Attorney, Agent, or Firm* — Farjami & Farjami LLP

(57) ABSTRACT

A method of speech encoding comprises generating a first synthesized speech signal from a first excitation signal, weighting the first synthesized speech signal using a first error weighting filter to generate a first weighted speech signal, generating a second synthesized speech signal from a second excitation signal, weighting the second synthesized speech signal using a second error weighting filter to generate a second weighted speech signal, and generating an error signal using the first weighted speech signal and the second weighted speech signal, wherein the first error weighting filter is different from the second error weighting filter. The method may further generate the error signal by weighting the speech signal using a third error weighting filter to generate a third weighted speech signal, and subtracting the first weighted speech signal and the second weighted speech signal from the third weighted speech signal to generate the error signal.

33 Claims, 9 Drawing Sheets

U.S. PATENT DOCUMENTS

| | | | | |
|---|---|---|---|---|
| 6,493,665 | B1 * | 12/2002 | Su et al. | 704/230 |
| 6,556,966 | B1 | 4/2003 | Gao | |
| 6,738,739 | B2 | 5/2004 | Gao | |
| 6,804,218 | B2 | 10/2004 | El-Maleh | |
| 6,925,435 | B1 * | 8/2005 | Gao | 704/220 |
| 7,062,432 | B1 * | 6/2006 | Gao | 704/220 |
| 7,124,078 | B2 * | 10/2006 | Accardi et al. | 704/223 |
| 7,590,096 | B2 | 9/2009 | El-Maleh | |

FOREIGN PATENT DOCUMENTS

| | | |
|---|---|---|
| JP | 2010-181889 | 8/2010 |
| JP | 2010-181890 | 8/2010 |
| JP | 2010-181891 | 8/2010 |
| JP | 2010-181892 | 8/2010 |
| JP | 2010-181893 | 8/2010 |

OTHER PUBLICATIONS

*Enhanced Variable Rate Codec, Speech Service Option 3 for Wideband Spread Spectrum Digital Systems*, TIA/EIA/IS-127 (Jan. 1997).

*Dual Rate Speech Coder for Multimedia Communications Transmitting at 5.3 and 6.3 kbit/s*, ITU-T Recommendation G.723.1, 1-27 (Mar. 1996).

*Coding of Speech at 9 kbit/s Using Conjugate-Structure Algebraic-Code-Excited Linear-Prediction* (*CS-ACELP*), ITU-T Recommendation G.729, 1-35 (Mar. 1996).

*Digital cellular telecommunications system* (*Phase 2*)*; Enhanced Full Rate* (*EFR*) *speech transcoding;* (*GSM 06.60 version 4.1.0*), European Telecommunications Standards Institute Draft EN 301 245 V4.1.0, 1-47 (Jun. 1998).

Changchun, Two Kinds of Pitch Predictors in Speech Compressing Coding, Journal of Electronics, vol. 14 No. 3 (Jul. 1997).

LeBlanc, Efficient Search and Design Procedures for Robust Multi-Stage VQ of LPC Parameters for 4 kb/s Speech Coding, IEEE Transactions on Speech and Audio Processing, vol. 1, No. 4, (Oct. 1993).

Ney, Dynamic Programming Algorithm for Optimal Estimation of Speech Parameter Contours, IEEE Transactions on Systems, Man, and Cybernetics, vol. SMC-13, No. 3 (Mar./Apr. 1983).

Shlomot, Delayed Decision Switched Prediction Multi-Stage LSF Quantization, Rockwell Telecommunication.

File History for U.S. Appl. No. 60/097,569.

File History for U.S. Appl. No. 12/218,242.

Defendants' Disclosure of Claim Terms and Proposed Constructions, Case 3:09-cv-00447-REP, Document 188, Filed Dec. 14, 2009, pp. 1-8.

U.S Civil Docket Index for Case #: 3:09-cv-00447-REP, As of: Mar. 14, 2011 05:44 PM EDT, pp. 1-38.

File History for U.S. Appl. No. 09/663,002.

File History for U.S. Appl. No. 11/251,179.

File History for U.S. Appl. No. 12/220,480.

Vien V. Nguyen, Vladimir Goncharoff, and John Damoulakis, "Correcting Spectral Envelope Shifts in Linear Predictive Speech Compression Systems", Proceedings of the Military Communications Conference (Milcom '90), vol. 1, 1990, pp. 354-358.

Masaaki Honda, "Speech Coding Using Waveform Matching Based on LPC Residual Phase Equalization", International Conference on Acoustics, Speech & Signal Processing (ICASSP '90), vol. 1, pp. 213-216.

File History for U.S. Appl. No. 12/321,934.

File History for U.S. Appl. No. 12/069,973.

* cited by examiner

METHOD AND APPARATUS FOR IMPROVED WEIGHTING FILTERS IN A CELP ENCODER

Matter enclosed in heavy brackets [ ] appears in the original patent but forms no part of this reissue specification; matter printed in italics indicates the additions made by reissue.

This application is a continuation of U.S. application Ser. No. 09/625,088, filed Jul. 25, 2000 now U.S. Pat. No. 7,013,268.

FIELD OF THE INVENTION

The present invention relates generally to digital voice encoding and, more particularly, to a method and apparatus for improved weighting filters in a CELP encoder.

BACKGROUND OF THE INVENTION

A general diagram of a CELP encoder 100 is shown in FIG. 1A. A CELP encoder uses a model of the human vocal tract to reproduce a speech input signal. The parameters for the model are actually extracted from the speech signal being reproduced, and it is these parameters that are sent to a decoder 114, which is illustrated in FIG. 1B. Decoder 114 uses the parameters to reproduce the speech signal. Referring to FIG. 1A, synthesis filter 104 is a linear predictive filter and serves as the vocal tract model for CELP encoder 100. Synthesis filter 114 takes an input excitation signal μ(n) and synthesizes a speech signal s'(n) by modeling the correlations introduced into speech by the vocal tract and applying them to the excitation signal μ(n).

In CELP encoder 100 speech is broken up into frames, usually 20 ms each, and parameters for synthesis filter 104 are determined for each frame. Once the parameters are determined, an excitation signal μ(n) is chosen for that frame. The excitation signal is then synthesized, producing a synthesized speech signal s'(n). The synthesized frame s'(n) is then compared to the actual speech input frame s(n) and a difference or error signal e(n) is generated by subtractor 106. The subtraction function is typically accomplished via an adder or similar functional component as those skilled in the art will be aware. Actually, excitation signal μ(n) is generated from a predetermined set of possible signals by excitation generator 102. In CELP encoder 100, all possible signals in the predetermined set are tried in order to find the one that produces the smallest error signal e(n). Once this particular excitation signal μ(n) is found, the signal and the corresponding filter parameters are sent to decoder 112, which reproduces the synthesized speech signal s'(n). Signal s'(n) is reproduced in decoder 112 using an excitation signal μ(n), as generated by decoder excitation generator 114, and synthesizing it using decoder synthesis filter 116.

By choosing the excitation signal that produces the smallest error signal e(n), a very good approximation of speech input s(n) can be reproduced in decoder 112. The spectrum of error signal e(n), however, will be very flat, as illustrated by curve 204 in FIG. 2. The flatness can create problems in that the signal-to-noise ratio (SNR), with regard to synthesized speech signal s'(n) (curve 202), may become too small for effective reproduction of speech signal s(n). This problem is especially prevalent in the higher frequencies where, as illustrated in FIG. 2, there is typically less energy in the spectrum of s'(n). In order to combat this problem, CELP encoder 100 includes a feedback path that incorporates error weighting filter 108. The function of error weighting filter 108 is to shape the spectrum of error signal e(n) so that the noise spectrum is concentrated in areas of high voice content. In effect, the shape of the noise spectrum associated with the weighted error signal $e_w(n)$ tracks the spectrum of the synthesized speech signal s(n), as illustrated in FIG. 2 by curve 206. In this manner, the SNR is improved and the quality of the reproduced speech is increased.

The weighted error signal $e_w(n)$ is also used to minimize the error signal by controlling the generation of excitation signal μ(n) In fact, signal $e_w(n)$ actually controls the selection of signal μ(n) and the gain associated with signal μ(n). In general, it is desirable that the energy associated with s'(n) be as stable or constant as possible. Energy stability is controlled by the gain associated with μ(n) and requires a less aggressive weighting filter 108. At the same time, however, it is desirable that the excitation spectrum (curve 202) of signal s'(n) be as flat as possible. Maintaining this flatness requires an aggressive weighting filter 108. These two requirements are directly at odds with each other, because the generation of excitation signal μ(n) is controlled by one weighting filter 108. Therefore, a trade-off must be made that results in lower performance with regard to one aspect or the other.

SUMMARY OF THE INVENTION

There is provided a speech encoder comprising a first weighting means for performing an error weighting on a speech input. The first weighting means is configured to reduce an error signal resulting from a difference between a first synthesized speech signal and the speech input. In addition, the speech encoder includes a means for generating the first synthesized speech signal from a first excitation signal, and a second weighting means for performing an error weighting on the first synthesized speech signal. The second weighting means is also configured to reduce the error signal resulting from the difference between the speech input and the first synthesized speech signal. There is also included a first difference means for taking the difference between the first synthesized speech signal and the speech input, where the first difference means is configured to produce a first weighted error signal. The speech encoder also includes a means for generating a second synthesized speech signal from a second excitation signal, and a third weighting means for performing an error weighting on the second synthesized speech signal. The third weighting means is configured to reduce a second error signal resulting from the difference between the first weighted error signal and the second synthesized speech signal. Then there is included a second difference means for taking the difference between the second synthesized speech signal and the first error signal, where the second difference means is configured to produce a second weighted error signal. Finally, there is included a feedback means for using the second weighted error signal to control the selection of the first excitation signal, and the selection of the second excitation signal.

There is also provided a transmitter that includes a speech encoder such as the one described above and a method for speech encoding. These and other embodiments as well as further features and advantages of the invention are described in detail below.

BRIEF DESCRIPTION OF THE DRAWINGS

In the figures of the accompanying drawings, like reference numbers correspond to like elements, in which.

DETAILED DESCRIPTION OF PREFERRED EMBODIMENTS

Figure 1A:
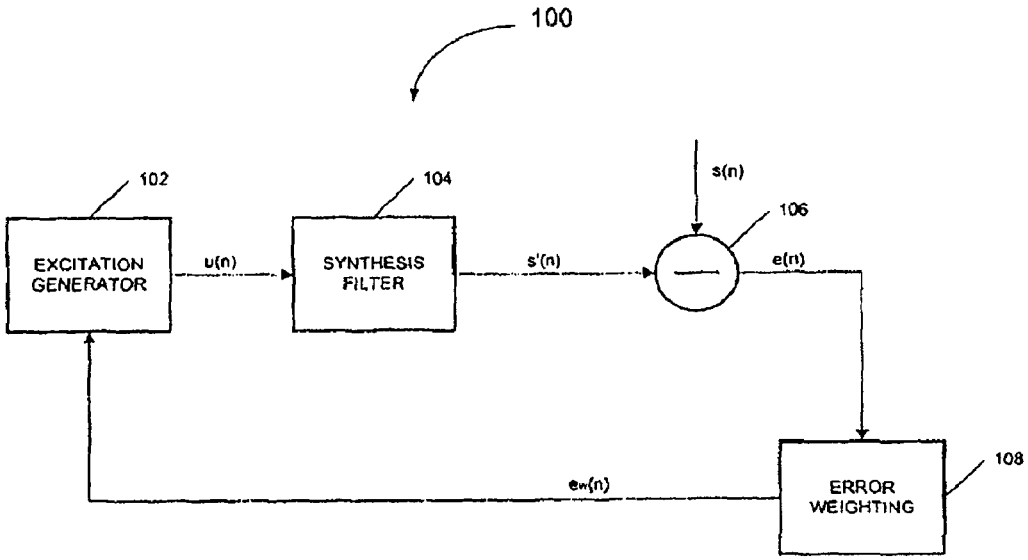
FIGURE 1A (PRIOR ART)
FIG. 1A is a block diagram illustrating a CELP encoder.
Figure 1B:
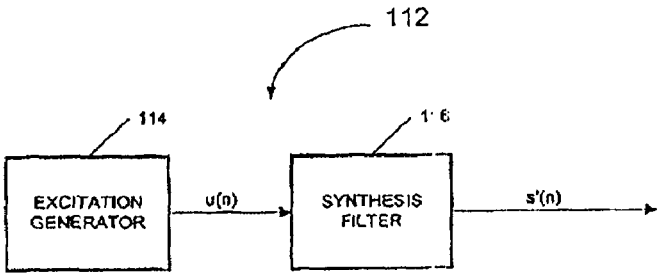
FIGURE 1B (PRIOR ART)
FIG. 1B is a block diagram illustrating a decoder that works in conjunction with the encoder of FIG. 1A.
Figure 2:
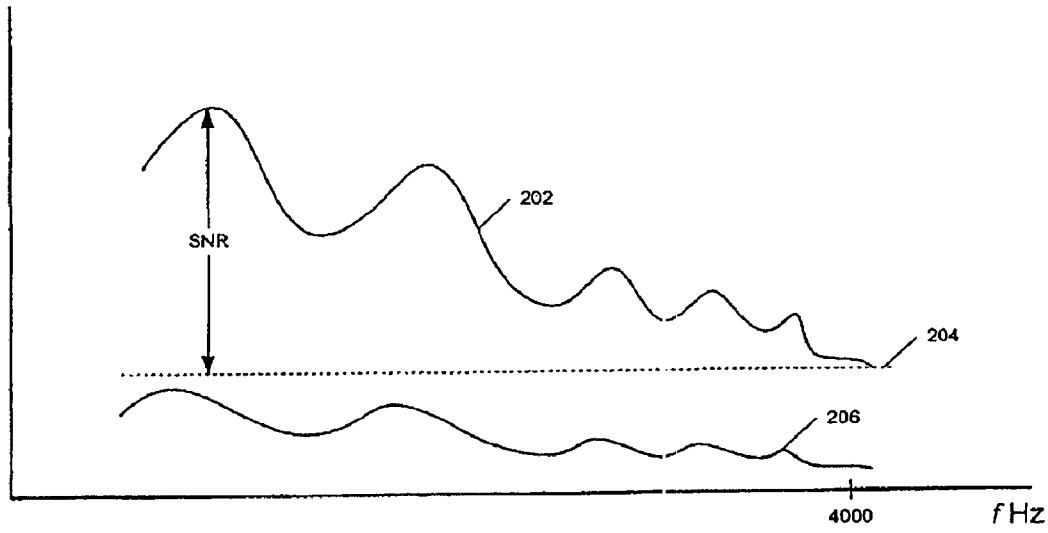
FIGURE 2 (PRIOR ART)
FIG. 2 is a graph illustrating the signal to noise ratio of a synthesized speech signal and a weighted error signal in the encoder illustrated in FIG. 1A.
Figure 3:
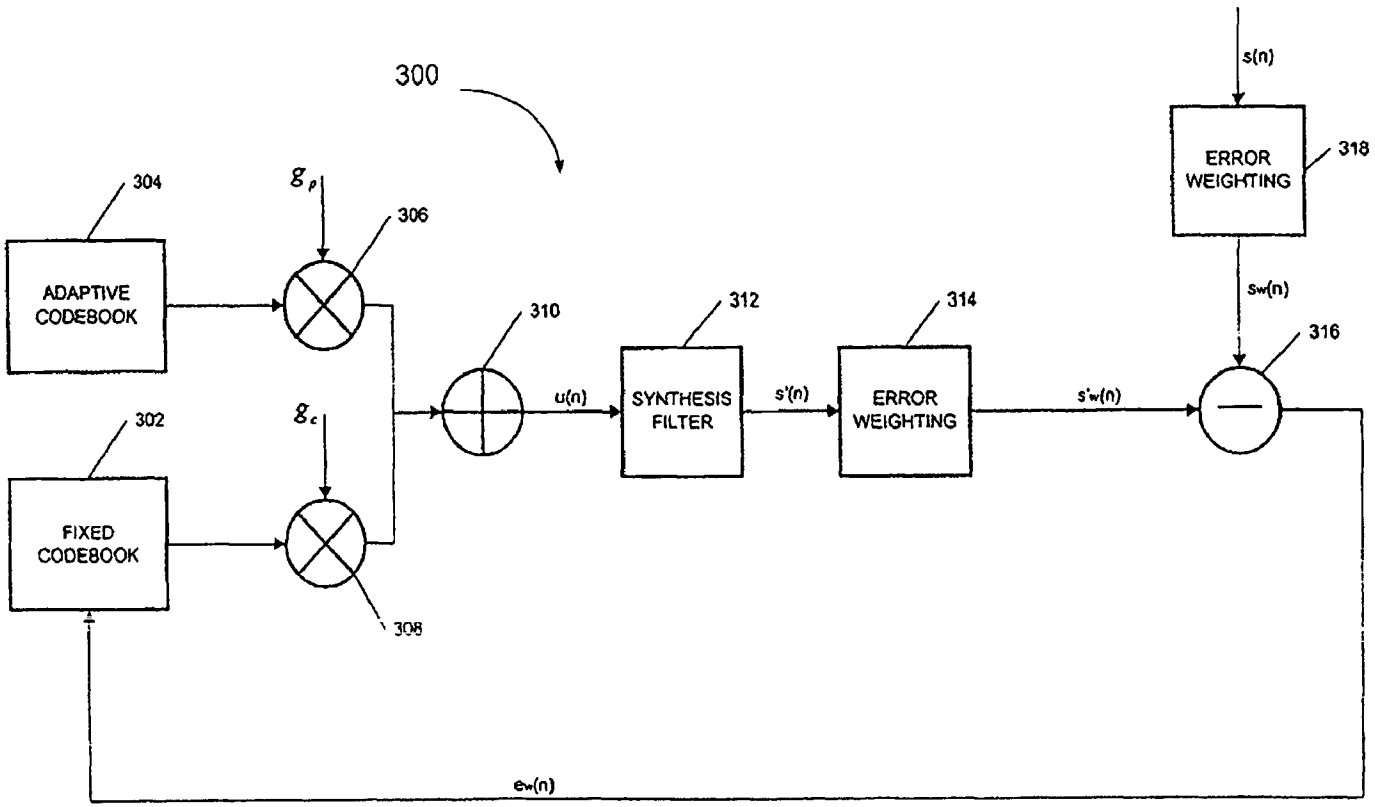
FIGURE 3 (PRIOR ART)
FIG. 3 is a second block diagram of a CELP encoder.

A typical implementation of a CELP encoder is illustrated in FIG. 3. Generally, excitation signal $\mu(n)$ is generated from a large vector quantizer codebook such as codebook 302 in encoder 300. Multiplier 308 multiplies the signal selected from codebook 302 by gain term ($g_c$) in order to control the power of excitation signal $\mu(n)$. Excitation signal $\mu(n)$ is then passed through synthesis filter 312, which is typically of the following form:

$$H(z)=I/A(z) \tag{1}$$

Where $$A(z)=1-\Sigma_{i=1}^{P}\alpha_i z^{-1}$$

Equation (2) represents a prediction error filter determined by minimizing the energy of a residual signal produced when the original signal is passed through synthesis filter 312. Synthesis filter 312 is designed to model the vocal tract by applying the correlation normally introduced into speech by the vocal tract to excitation signal $\mu(n)$. The result of passing excitation signal $\mu(n)$ through synthesis filter 312 is synthesized speech signal s'(n).

Synthesized speech signal s'(n) is passed through error weighting filter 314, producing weighted synthesized speech signal $s'_w(n)$. Speech input s(n) is also passed through an error weighting filter 318, producing weighted speech signal $s_w(n)$. Weighted synthesized speech signal $s'_w(n)$ is subtracted from weighted speech signal $s_w(n)$, which produces an error signal. The function of the error weighting filters 314 and 318 is to shape the spectrum of the error signal so that the noise spectrum of the error signal is concentrated in areas of high voice content. Therefore, the error signal generated by subtractor 316 is actually a weighted error signal $e_w(n)$.

Weighted error signal $e_w(n)$ is feedback to control the selection of the next excitation signal from codebook 302 and also to control the gain term ($g_c$) applied thereto. Without the feedback, every entry in codebook 302 would need to be passed through synthesis filter 302 and subtractor 316 to find the entry that produced the smallest error signal. But by using error weighting filters 314 and 318 and feeding weighted error signal $e_w(n)$ back, the selection process can be streamlined and the correct entry found much quicker.

Codebook 302 is used to track the short term variations in speech signal s(n); however, speech is characterized by long-term periodicities that are actually very important to effective reproduction of speech signal s(n). To take advantage of these long-term periodicities, an adaptive codebook 304 may be included so that the excitation signal $\mu(n)$ will include a component of the form $G\mu(n-\alpha)$, where $\alpha$ is the estimated pitch period. Pitch is the term used to describe the long-term periodicity. The adaptive codebook selection is multiplied by gain factor ($g_p$) in multiplier 306. The selection from adaptive codebook 304 and the selection from codebook 302 are then combined in adder 310 to create excitation signal $\mu(n)$. As an alternative to including the adaptive codebook, synthesis filter 312 may include a pitch filter to model the long-term periodicity present in the voiced speech.

Figure 4:
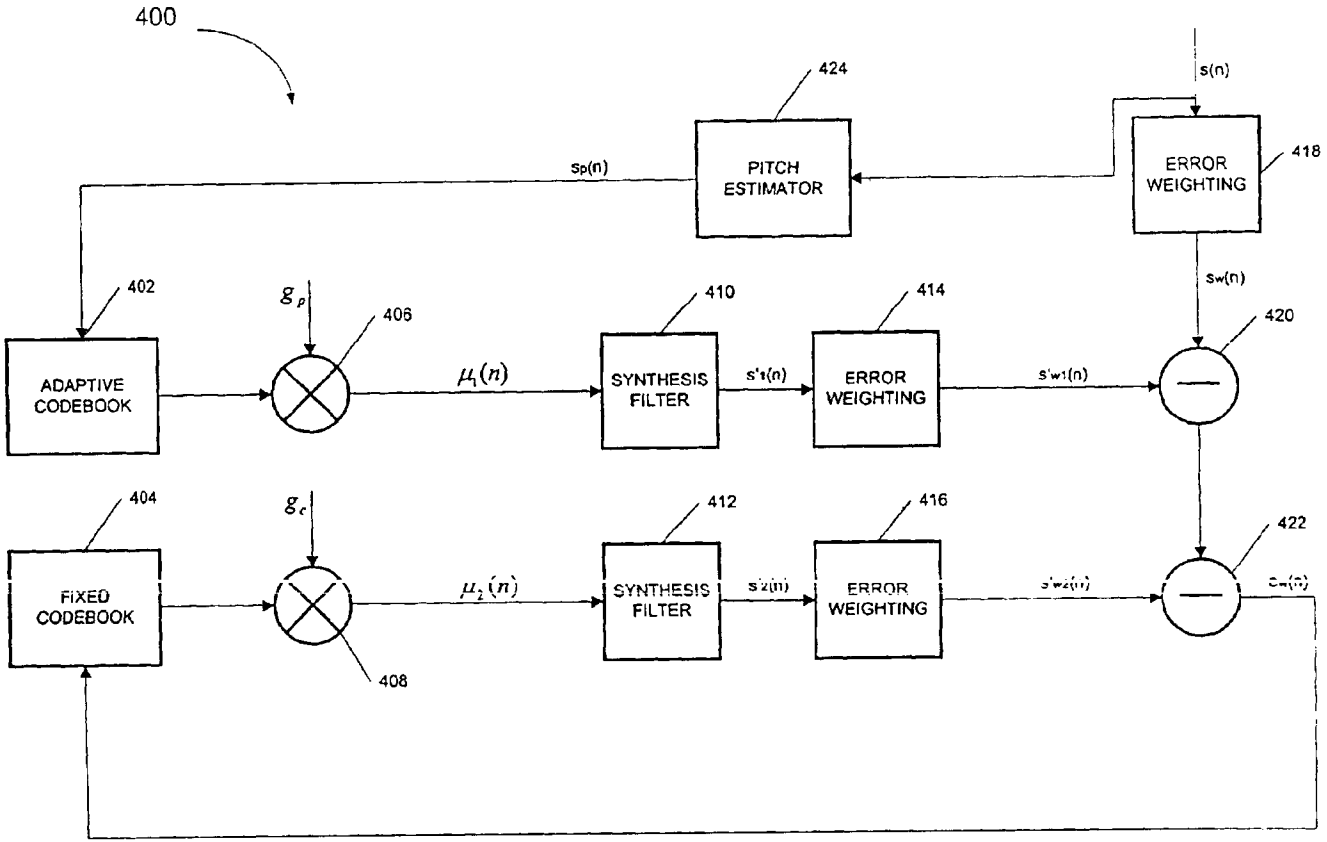
FIG. 4 is a block diagram illustrating one embodiment of a speech encoder in accordance with the invention.

In order to address the problem of balancing energy stability and excitation spectrum flatness, the invention uses the approach illustrated in FIG. 4. Encoder 400, in FIG. 4, uses parallel signal paths for an excitation signal $\mu_1(n)$, from adaptive codebook 402, and for an excitation signal $\mu_2(n)$ from fixed codebook 404. Each excitation signal $\mu_1(n)$ and $\mu_2(n)$ are multiplied by independent gain terms ($g_p$) and ($g_c$) respectively. Independent synthesis filters 410 and 412 generate synthesized speech signals $s'_1(n)$ and $s'_2(n)$ from excitation signals $\mu_1(n)$ and $\mu_2(n)$ and independent error weighting filters 414 and 416 generate weighted synthesized speech signals $s'_{w1}(n)$ and $s'_{w2}(n)$, respectively.

Weighted synthesized speech signal $s'_{w1}(n)$ is subtracted in subtractor 420 from weighted speech signal $s_w(n)$, which is generated from speech signal s(n) by error weighting filter 418. Weighted synthesized speech signals $s'_{w2}(n)$ is subtracted from the output of subtractor 420 in subtractor 422, thus generating weighted error signal $e_w(n)$. Therefore, weighted error signal $e_w(n)$ is formed in accordance with the following equation:

$$e_w(n)=s_w(n)-s'_{w1}(n)-s'_{w2}(n) \tag{3}$$

which is the same as:

$$e_w(n)=s_w(n)-(s'_{w1}(n)+s'_{w2}(n)) \tag{4}$$

Equation (4) is essentially the same as the equation for $e_w(n)$ in encoder 300 of FIG. 3. But in encoder 400, the error weighting and gain terms applied to the selections from the codebooks are independent and can either be independently controlled through feedback or independently initialized. In fact, weighted error signal $e_w(n)$ in encoder 400 is used to independently control the selection from fixed codebook 404 and the gain ($g_c$) applied thereto, and the selection from a adaptive codebook 402 and the gain ($g_p$) applied thereto.

Additionally, different error weighting can be used for each error weighting filter 414, 416, and 418. In order to determine the best parameters for each error weighting filter 414, 416 and 418, different parameters are tested with different types of speech input sources. For example, the speech input source may be a microphone or a telephone line, such as a telephone line used for an Internet connection. The speech input can, therefore, vary from very noisy to relatively calm. A set of optimum error weighting parameters for each type of input is determined by the testing. The type of input used in encoder 400 is then the determining factor for selecting the appropriate set of parameters to be used for error weighting filters 414, 416, and 418. The selection of optimum error weighting parameters combined with independent control of the codebook selections and gains applied thereto, allows for effective balancing of energy stability and excitation spectrum flatness. Thus, the performance of encoder 400 is improved with regard to both.

Getting the pitch correct for speech input s(n) is also very important. If the pitch is not correct then the long-term periodicity will not be correct and the reproduced speech will not sound good. Therefore, a pitch estimator 424 may be incorporated into encoder 400. In one implementation, pitch estimator 424 generates a speech pitch estimate $s_p(n)$, which is used to further control the selection from adaptive codebook 402. This further control is designed to ensure that the long-term periodicity of speech input s(n) is correctly replicated in the selections from adaptive codebook 402.

Figure 5:
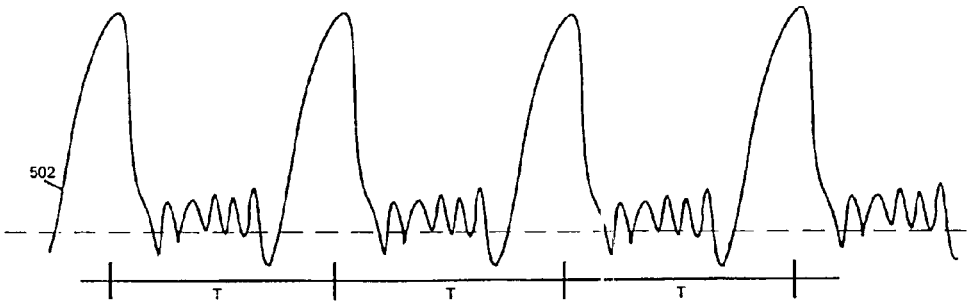
FIG. 5 is a graph illustrating the pitch of a speech signal.

The importance of the pitch is best illustrated by the graph in FIG. 5, which illustrates a speech sample 502. As can be seen, the short-term variation in the speech signal can change drastically from point to point along speech sample 502. But the long-term variation tends to be very periodic. The period of speech sample 502 is denoted as (T) in FIG. 5. Period (T) represents the pitch of speech sample 502; therefore, if the pitch is not estimated accurately, then the reproduced speech signal may not sound like the original speech signal.

Figure 6:
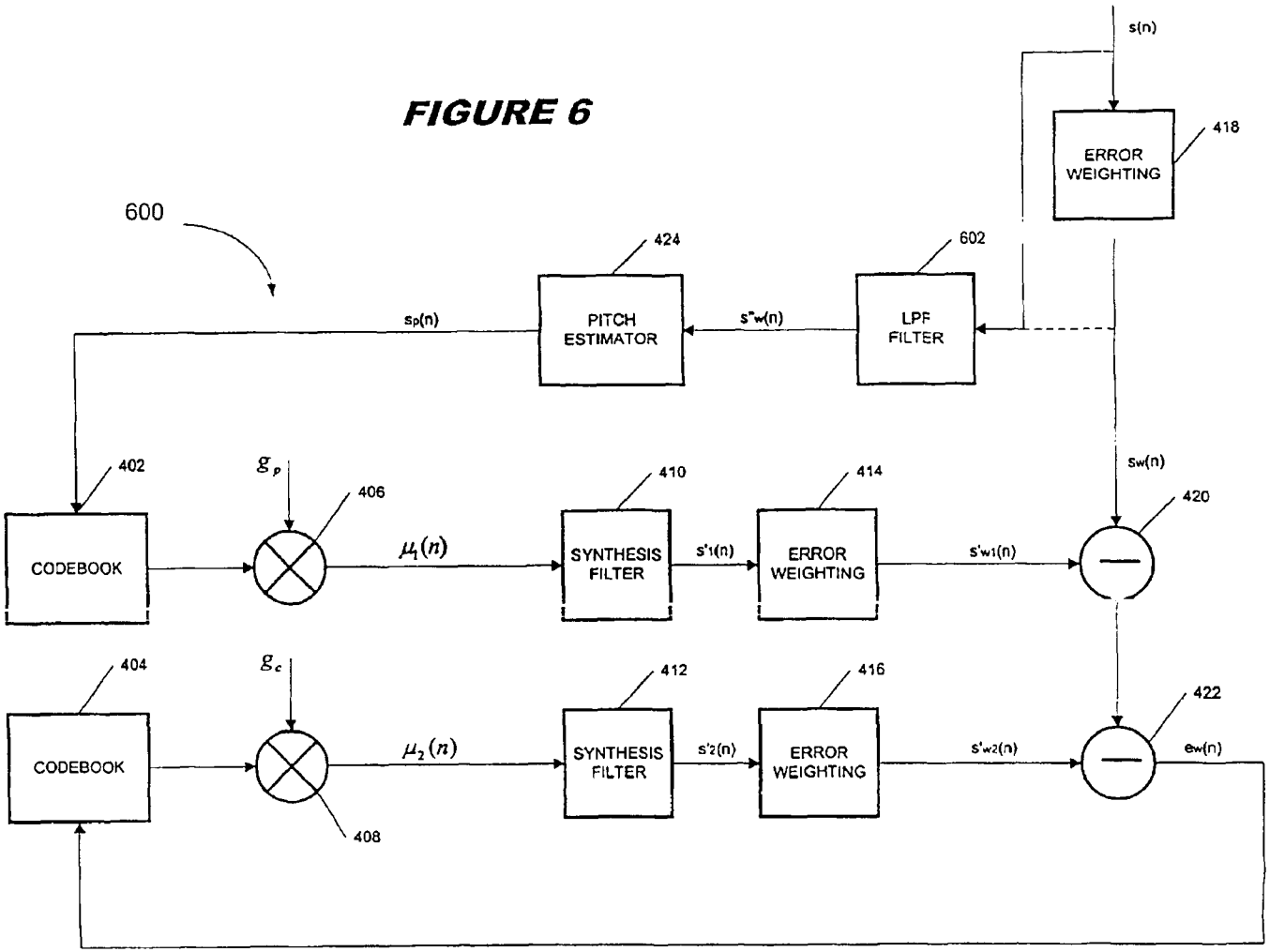
FIG. 6 is a block diagram of a second embodiment of a speech encoder in accordance with the invention.

In order to improve the speech pitch estimation $s_p(n)$ encoder 600 of FIG. 6 includes an additional filter 602. Filter 602 generates a filtered weighted speech signal $s''_w(n)$, which is used by pitch estimator 424, from weighted speech signal $s_w(n)$. In a typical implementation, filter 602 is a low pass filter (LPF). This is because the low frequency portion of speech input s(n) will be more periodic than the high frequency portion. Therefore, filter 602 will allow pitch estimator 424 to make a more accurate pitch estimation by emphasizing the periodicity of speech input s(n).

Figure 7A:
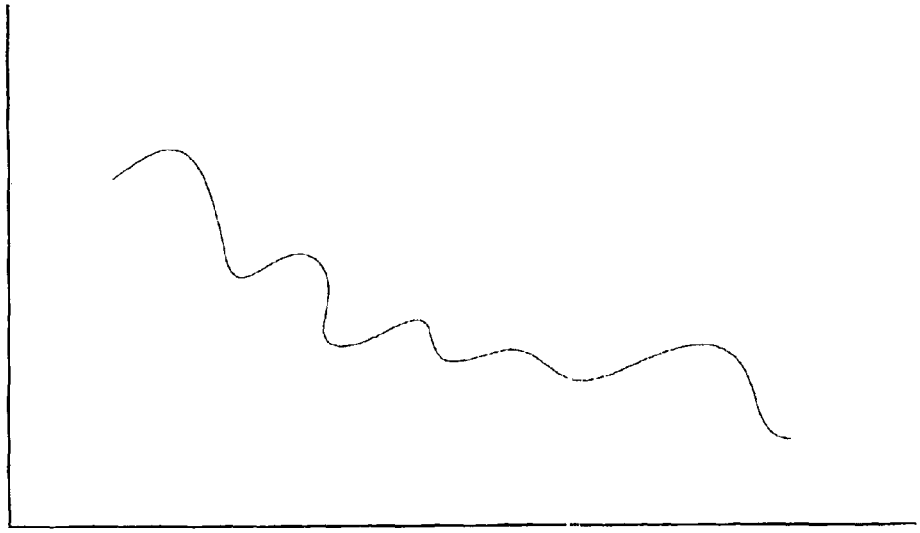
FIG. 7A is a diagram illustrating the concentration of energy of the speech signal in the low frequency portion of the spectrum.
Figure 7B:
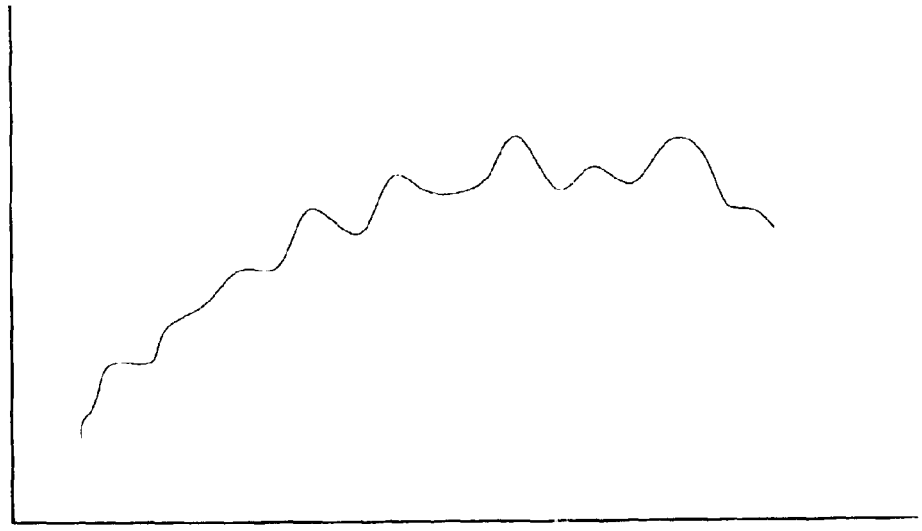
FIG. 7B is a diagram illustrating the concentration of energy of the speech signal in the high frequency portion of the spectrum.

In an alternative implementation of encoder 600, filter 602 is an adaptive filter. Therefore, as illustrated in FIG. 7A, when the energy in speech input s(n) is concentrated in the low frequency portion of the spectrum, very little or no filtering is applied by filter 602. This is because the low frequency portion and thus the periodicity of speech input s(n) is already emphasized. If, however, the energy in speech input s(n) is concentrated in the higher frequency portion of the spectrum (FIG. 7B), then a more aggressive low pass filtering is applied by filter 602. By varying the degree of filtering applied by filter 602 according to the energy concentration of speech input s(n), a more optimized speech input estimation $s_p(n)$ is maintained.

As shown in FIG. 6, the input to filter 602 is speech input s(n). In this case, filter 602 will incorporate a fourth error weighting filter to perform error weighting on speech input s(n). This configuration enables the added flexibility of making the error weighting filter incorporated in filter 602 different from error weighting filter 418, in particular, as well as from filters 414 and 416. Therefore, the implementation illustrated in FIG. 6 allows for each of four error weighting filters to be independently configured so as to provide the optimum error weighting of each of the four input signals. The result is a highly optimized estimation of speech input s(n).

Alternatively, filter 602 may take its input from the output of error weighting filter 418. In this case, error weighting filter 418 provides the error weighting for s"w(n), and filter 602 does not incorporate a fourth error weighting filter. This implementation is illustrated by the dashed line in FIG. 6. This implementation may be used when different error weighting for s"w(n) and sw(n) is not required. The resulting implementation of filter 602 only incorporates the LDF function and is easier to design and implement relative to the previous implementation.

Figure 8:
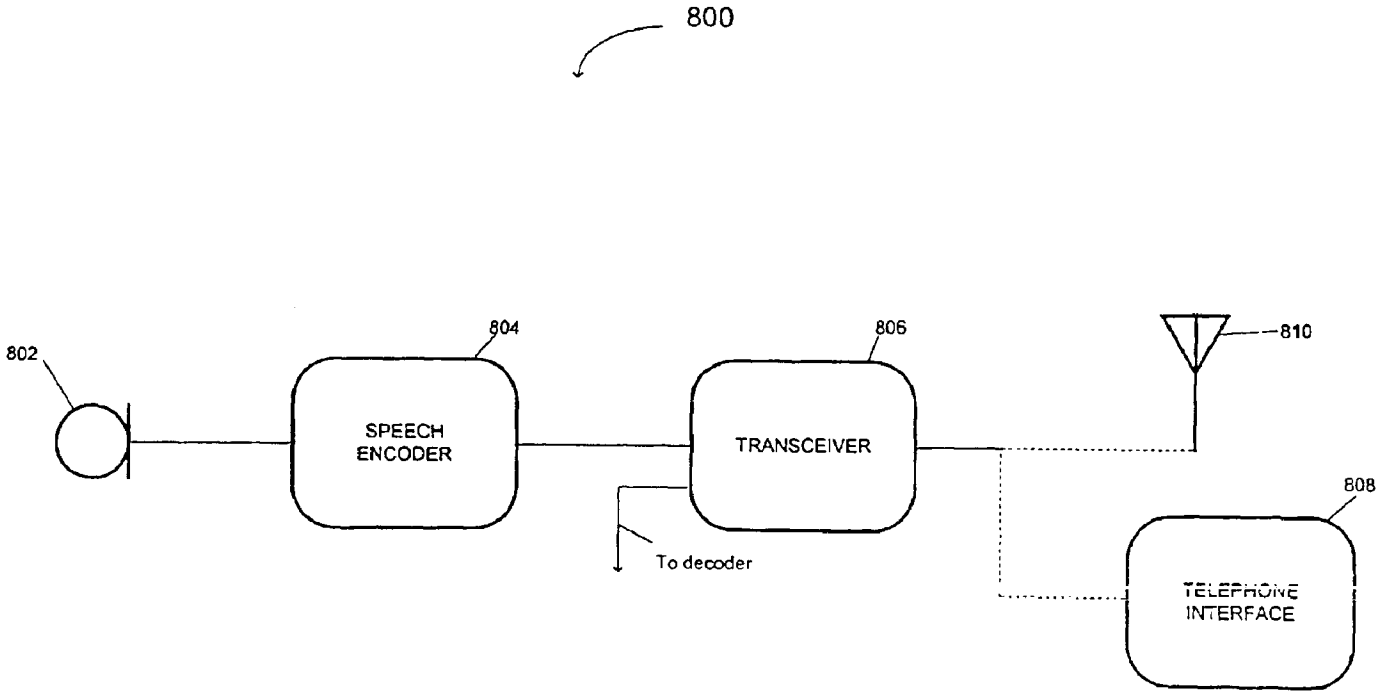
FIG. 8 is a block diagram, illustrating a transmitter that includes a speech encoder such as the speech encoder illustrated in FIG. 4 or FIG. 6.

There is also provided a transmitter 800 as illustrated in FIG. 8. Transmitter 800 comprises a voice input means 802, which is typically a microphone. Speech input means 802 is coupled to a speech encoder 804, which encodes speech input provided by speech input means 802 for transmission by transmitter 800. Speech encoder 804 is an encoder such as encoder 400 or encoder 600 as illustrated in FIG. 4 and FIG. 6, respectively. As such, the encoded data generated by speech encoder 804 comprises information relating to the selection for codebooks 402 and 404 and for gain terms ($g_p$) and ($g_c$), as well as parameters for synthesis filters 410 and 412. A device, which receives the transmission from transmitter 800, will use these parameters to reproduce the speech input provided by speech input means 802. For example, such a device may include a decoder as described in U.S. patent application Ser. No. 09/624,187, filed Jul. 25, 2000, now U.S. Pat. No. 6,466,904, titled "Method and Apparatus Using Harmonic Modeling in an Improved Speech Decoder," which is incorporated herein by reference in its entirety.

Speech encoder 804 is coupled to a transceiver 806, which converts the encoded data from speech encoder 804 into a signal that can be transmitted. For example, many implementations of transmitter 800 will include an antenna 810. In this case, transceiver 806 will convert the data from speech encoder 804 into an RF signal for transmission via antenna 810. Other implementations, however, will have a fixed line interface such as a telephone interface 808. Telephone interface 808 may be an interface to a PSTN or ISDN line, for example, and may be accomplished via a coaxial cable connection, a regular telephone line, or the like. In a typical implementation, telephone interface 808 is used for connecting to the Internet.

Transceiver 806 will typically be interfaced to a decoder as well for bidirectional communication; however, such a decoder is not illustrated in FIG. 8, because it is not particularly relevant to the invention.

Transmitter 800 is capable of implementation in a variety of communication devices. For example, transmitter 800 may, depending on the implementation, be included in a telephone, a cellular/PCS mobile phone, a cordless phone, a digital answering machine, or a personal digital assistant.

Figure 9:
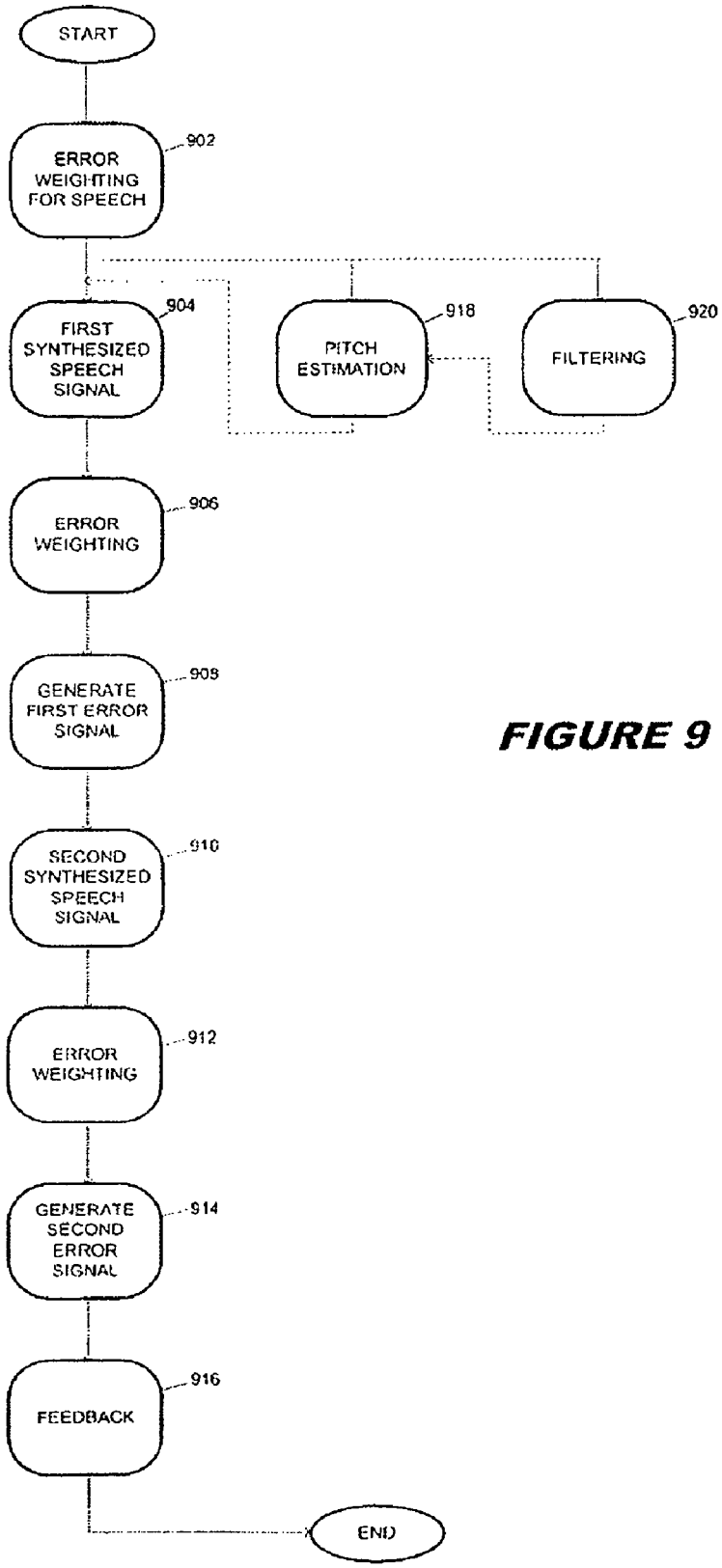
FIG. 9 is a process flow diagram illustrating a method of speech encoding such in accordance with the invention.

There is also provided a method of speech encoding comprising the steps illustrated in FIG. 9. First, in step 902, error weighting is performed on a speech signal. For example, the error weighting may be performed on a speech signal sent by an error weighting filter 418. Then in step 904, a first synthesized speech signal is generated from a first excitation signal multiplied by a first gain term. For example, s'(n) as generated from $\mu_1(n)$ multiplied by gain term ($g_p$) in FIG. 4. In step 906, error weighting is then performed on the first synthesized speech signal to create a weighted first synthesized speech signal, such as $s'_{w1}(n)$ illustrated in FIG. 4. Then, in step 408, a first error signal is generated by taking the difference between the weighted speech signal and the weighted first synthesized speech signal.

Next, in step 910, a second synthesized speech signal is generated from a second excitation signal multiplied by a second gain term. For example, $s'_2(n)$ as generated in FIG. 4 by multiplying $\mu_2(n)$ by ($g_c$). Then, in step 912, error weighting is performed on the second synthesized speech signal to create a weighted second synthesized speech signal, such as $s'_{w2}(n)$ in FIG. 4. In step 914, a second weighted error signal is generated by taking the difference between the first weighted error signal and the weighted second synthesized speech signal. This second weighted error signal is then used, in step 916, to control the generation of subsequent first and second synthesized speech signals. In other words, the second weighted error signal is used as feedback to control subsequent values of the second weighted error signal. For example, such feedback is illustrated by the feedback of $e_w(n)$ in FIG. 4.

In certain implementations, pitch estimation is performed on the speech signal as illustrated in FIG. 4 by optional step 918. The pitch estimation is then used to control the generation of at least one of the first and second synthesized speech signals. For example, a pitch estimation $s_p(n)$ is generated by pitch estimator 424 as illustrated in FIG. 4. Additionally, in some implementations, a filter is used to optimize the pitch estimation. Therefore, as illustrated by optional step 920 in FIG. 4, the speech signal is filtered and a filtered version of the speech signal is used for the pitch estimation in step 918. For example, a filter 602, as illustrated in FIG. 6, may be used to generate a filtered speech signal $s''_w(n)$. In certain implementations, the filtering is adaptive based on the energy spectrum of the speech signal.

While various embodiments of the invention have been presented, it should be understood that they have been presented by way of example only and not limitation. It will be apparent to those skilled in the art that many other embodiments are possible, which would not depart from the scope of the invention. For example, in addition to being applicable in an encoder of the type described, those skilled in the art will understand that there are several types of analysis-by-synthesis methods and that the invention would be equally applicable in encoders implementing these methods.

What is claimed is:

1. A method of speech encoding comprising:

generating a first synthesized speech signal from a first excitation signal;

weighting said first synthesized speech signal using a first error weighting filter to generate a first weighted speech signal;

generating a second synthesized speech signal from a second excitation signal;

weighting said second synthesized speech signal using a second error weighting filter to generate a second weighted speech signal; and generating an error signal using said first weighted speech signal and said second weighted speech signal;

wherein said first error weighting filter is different from said second error weighting filter.

2. The method of claim 1, wherein said generating said error signal further comprises:

weighting said speech signal using a third error weighting filter to generate a third weighted speech signal; and subtracting said first weighted speech signal and said second weighted speech signal from said third weighted speech signal to generate said error signal.

3. The method of claim 2, wherein said third error weighting filter is independent from and the same as said first error weighting filter.

4. The method of claim 1, wherein said first excitation signal is from a first codebook and said second excitation signal is from a second codebook, said method further comprising:

using said error signal to independently select a third excitation signal from said first codebook and a fourth excitation signal from said second codebook; and using said error signal to independently select a third gain to apply to said third excitation signal and a fourth gain to apply to said fourth excitation signal.

5. The method of claim 1, wherein said generating said first synthesized speech signal uses a first synthesizer and said generating said second synthesized speech signal uses a second synthesizer, and wherein said first synthesizer is independent from said second synthesizer.

6. The method of claim 5, wherein said first synthesizer is the same as said second synthesizer.

7. A speech encoder comprising:

a first codebook;

a second codebook;

a speech synthesizer configured to generate a first synthesized speech signal from a first excitation signal of said first codebook and to generate a second synthesized speech signal from a second excitation signal of said second codebook;

a first error weighting filter configured to generate a first weighted speech signal from said first synthesized speech signal;

a second error weighting filter configured to generate a second weighted speech signal from said second synthesized speech signal; and an error signal generator configured to generate an error signal using said first weighted speech signal and said second weighted speech signal;

wherein said first error weighting filter is different from said second error weighting filter.

8. The speech encoder of claim 7, wherein said speech synthesizer includes a first speech synthesizer for generating said first synthesized speech signal and a second speech synthesizer for generating said second synthesized speech signal.

9. The speech encoder of claim 7 further comprising a third error weighting filter to generate a third weighted speech signal from said speech signal, wherein said error signal generator includes a signal subtractor configured to subtract said first weighted speech signal and said second weighted speech signal from said third weighted speech signal to generate said error signal.

10. The speech encoder of claim 9, wherein said third error weighting filter is independent from and the same as said first error weighting filter.

11. The speech encoder of claim 7, wherein said speech encoder uses said error signal to independently select a third excitation signal from said first codebook and a fourth excitation signal from said second codebook, and to independently select a third gain to apply to said third excitation signal and a fourth gain to apply to said fourth excitation signal.

12. A speech encoder comprising:

means for generating a first synthesized speech signal from a first excitation signal;

means for weighting said first synthesized speech signal to generate a first weighted speech signal;

means for generating a second synthesized speech signal from a second excitation signal;

means for weighting said second synthesized speech signal to generate a second weighted speech signal; and means for generating an error signal using said first weighted speech signal and said second weighted speech signal;

wherein said means for weighting said first synthesized speech signal is different from said means for weighting said second synthesized speech signal.

13. The speech encoder of claim 12 farther comprising:

means for weighting said speech signal to generate a third weighted speech signal; and means for subtracting said first weighted speech signal and said second weighted speech signal from said third weighted speech signal to generate said error signal.

14. The speech encoder of claim 13, wherein means for weighting said speech signal is independent from and the same as said means for weighting said first synthesized speech signal.

15. The speech encoder of claim 12, wherein said first excitation signal is from a first codebook and said second excitation signal is from a second codebook, said speech encoder further comprising means for using said error signal to independently select a third excitation signal from said first codebook and a fourth excitation signal from said second codebook, and means for using said error signal to independently select a third gain to apply to said third excitation signal and a fourth gain to apply to said fourth excitation signal.

16. The speech encoder of claim 12, wherein said means for generating said first synthesized speech signal is independent from said means for generating said second synthesized speech signal.

17. The speech encoder of claim 16, said means for generating said first synthesized speech signal is the same as said means for generating said second synthesized speech signal.

*18. A method of encoding a speech signal for use by a device, the method comprising:*

*performing, by the device, a first error weighting of the speech signal to generate a weighted speech signal;*

*generating, by the device, a first synthesized speech signal from a first excitation signal;*

*performing, by the device, a second error weighting of the first synthesized speech signal to generate a first weighted synthesized speech signal;*

*generating, by the device, a second synthesized speech signal from a second excitation signal;*

*performing, by the device, a third error weighting on the second synthesized speech signal to generate a second weighted synthesized speech signal; and*

*wherein the third error weighting is different from the second error weighting.*

*19. The method of claim 18 further comprising:*

*generating a first error signal as a difference between the weighted speech signal and the first weighted synthesized speech signal.*

*20. The method of claim 19, wherein the first excitation signal is from the first codebook and the second excitation signal is from a second codebook, the method further comprising:*

*using the first error signal to independently select a third excitation signal from the first codebook and a fourth excitation signal from the second codebook; and*

*using the first error signal to independently select a third gain to apply to the third excitation signal and a fourth gain to apply to the fourth excitation signal.*

*21. The method of claim 18, wherein the device is a communication device.*

*22. The method of claim 18, wherein the device is one of a telephone, a mobile phone, a cordless phone, a digital answering machine or a personal digital assistant.*

*23. The speech encoder of claim 7, wherein the speech encoder is included in a device.*

*24. The speech encoder of claim 23, wherein the device is a communication device.*

*25. The speech encoder of claim 23, wherein the device is one of a telephone, a mobile phone, a cordless phone, a digital answering machine or a personal digital assistant.*

*26. The method of claim 1, wherein the method of speech encoding is performed by a device.*

*27. The method of claim 26, wherein the device is a communication device.*

*28. The method of claim 26, wherein the device is one of a telephone, a mobile phone, a cordless phone, a digital answering machine or a personal digital assistant.*

*29. A device comprising:*

*a speech encoder configured to:*

*perform a first error weighting of the speech signal to generate a weighted speech signal;*

*generate a first synthesized speech signal from a first excitation signal;*

*perform a second error weighting of the first synthesized speech signal to generate a first weighted synthesized speech signal;*

*generate a second synthesized speech signal from a second excitation signal;*

*perform a third error weighting on the second synthesized speech signal to generate a second weighted synthesized speech signal; and*

*wherein the third error weighting is different from the second error weighting.*

*30. The device of claim 29, wherein the speech encoder is further configured to generate a first error signal as a difference between the weighted speech signal and the first weighted synthesized speech signal.*

*31. The device of claim 30, wherein the first excitation signal is from the first codebook and the second excitation signal is from a second codebook, and wherein the speech encoder is further configured to:*

*Use the first error signal to independently select a third excitation signal from the first codebook and a fourth excitation signal from the second codebook; and*

*Use the first error signal to independently select a third gain to apply to the third excitation signal and a fourth gain to apply to the fourth excitation signal.*

*32. The device of claim 29, wherein the device is a communication device.*

*33. The device of claim 29, wherein the device is one of a telephone, a mobile phone, a cordless phone, a digital answering machine or a personal digital assistant.*

* * * * *